April 25, 1933. H. F. PARKER 1,904,998

BRAKE

Filed May 17, 1930

INVENTOR.
HUMPHREY F. PARKER
BY M.W. McConkey
ATTORNEY

Patented Apr. 25, 1933

1,904,998

UNITED STATES PATENT OFFICE

HUMPHREY F. PARKER, OF SOUTH BEND, INDIANA, ASSIGNOR TO BENDIX BRAKE COMPANY, OF SOUTH BEND, INDIANA, A CORPORATION OF ILLINOIS

BRAKE

Application filed May 17, 1930. Serial No. 453,383.

This invention relates to brakes and more particularly to internal expanding brakes, of the type in which the friction members anchor at one end when the drum is turning in one direction and at the other end when the drum is turning in the other direction.

A major object of the invention is to improve the operating means for the friction members.

An important object of the invention is to simplify the operating means and thereby materially reduce the costs in production.

An important feature of the invention is a novel lever and linkage between the lever and friction member, designed to provide an equal action in the application of the friction members.

Other objects of the invention will appear from the following description, taken in connection with the drawing, forming a part of this specification, and in which:—

Figure 1:
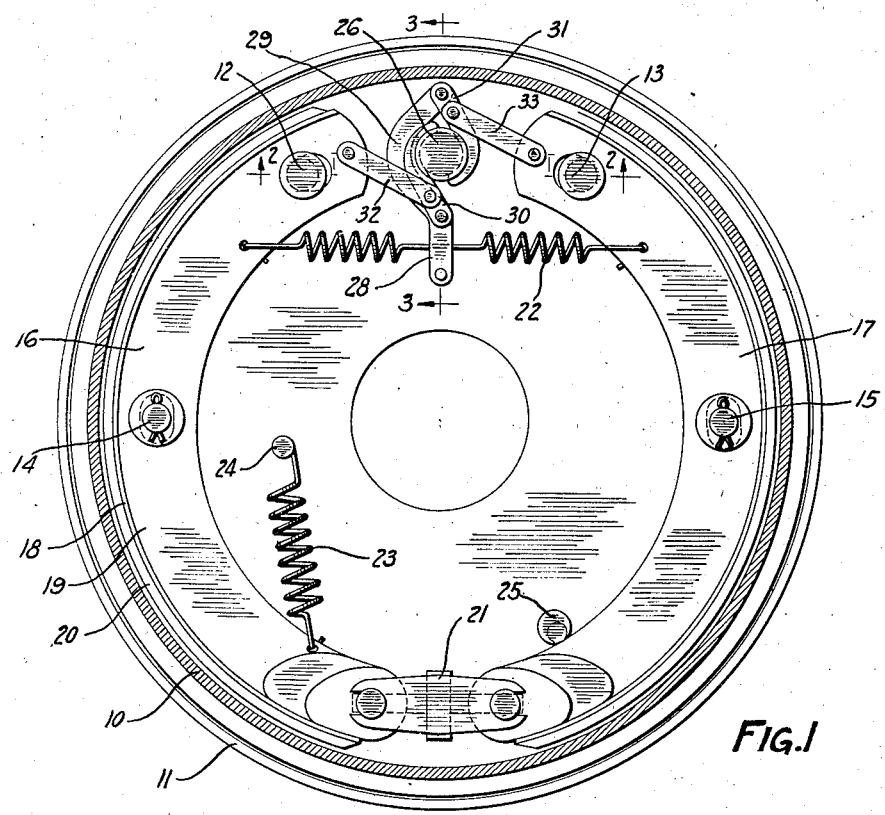
Figure 1 is a side elevation of a brake embodied in the invention.
Figure 2:
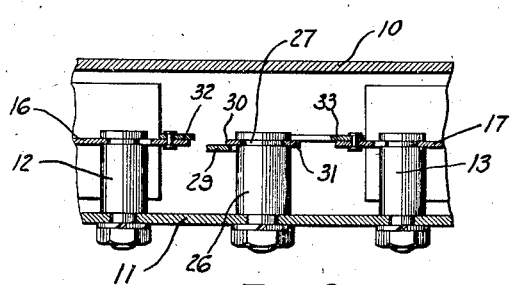
Figure 2 is a sectional view substantially on line 2—2 Figure 1.
Figure 3:
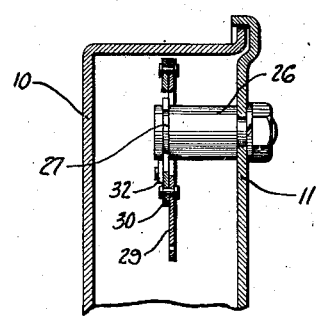
Figure 3 is a sectional view substantially on line 3—3 Figure 1.

In the embodiment illustrated, there is provided a conventional rotatable drum 10, at the open side of which is a stationary support such as a backing plate 11. Positioned on the backing plate 11 are anchors 12 and 13 and steady rests 14 and 15. Mounted for movement on the anchor 12 and steady rest 14 is a primary shoe 16 and positioned for movement on the anchor 13 and steady rest 15 is a secondary shoe 17.

These shoes are interchangeable, they are of a conventional type each having a rim 18 and a reinforcing web 19, and the rim has secured thereto a suitable lining 20 adaptable for engagement with the drum. The articulating ends of the shoes are connected as by a suitable adjusting screw 21 and connected between the shoes adjacent their separable ends is a coil spring 22.

The spring 22 co-operates with a coil spring 23 connected between the primary shoe and a fixed stop 24 to return the shoes to the off position. An adjustable stop 25 positioned on the backing plate determines the relative position of the shoes, when in the off position, to the radius of the drum.

Positioned on the backing plate intermediate the separable ends of the shoes 16 and 17 is a stud 26 having a circumferential groove 27, the object of which will hereinafter appear. A floating lever 28 controlled by an operating cable, not shown, has an arcuate body portion 29 positioned in spaced relation to the circumference of the stud 26. This lever is adapted to move circumferentially to the stud and it has pivotally connected thereto oppositely disposed arms or levers 30 and 31, each having an arcuate portion engaging the circumferential groove 27 and to slide therein, and these levers are connected by links 32 and 33 to the respective ends of the primary and secondary shoes.

It is to be noted that the pivotal connections of the levers 31 and 32 are equally spaced from the axis of the stud 27, and that the pivotal connections between the levers 30 and 31 and the links 32 and 33 are equally spaced from the pivotal connections of the levers 30 and 31 to the lever 28, so that an equalization in the operation of the applying means may be attained.

In operation, a pull is placed on the lever 28 to the left in Figure 1. The applied force causes the lever 28 to rock on an axis, which is substantially the axis of the stud 26. Because of this centrifugal movement of the lever 28, the primary shoe connected to the lever 28 through the lever 30 and link 32 is moved in one direction, and the secondary shoe connected to the lever 28 through the lever 31 and link 33 is moved in the opposite direction.

This structure provides an equalized operating means for the shoes or friction members, and in addition thereto, by reason of the particular arrangement, a compound leverage is attained which materially reduces the force necessary for the application of the friction members.

It is to be understood that the form of the invention herein shown and described is to be taken as the preferred example, and that various changes in shape, sizes and arrangement of parts may be resorted to without departing from the spirit of the invention, or the scope of the subjoined claims.

Having thus described the various features of the invention, which I claim and desire to secure by Letters Patent is:—

1. A brake comprising a fixed support forming a brake anchorage, levers slidably fulcrumed on the support, operating means connected to the power applying ends of the levers and means connecting the levers to the separable ends of the friction member of the brake.

2. A brake comprising a fixed support, corresponding levers slidably fulcrumed on the support, a member connected to the power applying ends of the levers, and means connecting the levers to the friction members of the brake.

3. A brake comprising a fixed projecting support, a plurality of levers fulcrumed on the support and adaptable for slidable and turning movement thereon, a member pivotally connected to the power applying ends of the respective levers and means connecting the levers to the friction members of the brake.

4. A brake comprising a fixed support having a circumferential groove, a plurality of levers having their fulcrums positioned for movement in the groove, a member connected to the power applying ends of the levers and means connecting the levers to the separable ends of a friction member.

5. A brake comprising a fixed support, a member adapted to move circumferentially to the support, levers pivotally secured to the member having their fulcrumed ends slidably engaging the fixed support and means connecting the levers to separable ends of the friction element of the brake.

6. A brake comprising a fixed support having a circumferential groove, a member movable circumferentially to the support, levers pivoted to the member in a plane diametrally of the support, the fulcrum ends of the levers engaging the circumferential groove and links connecting the levers to the separable ends of a frictional member.

7. A brake comprising a fixed support having a circumferential groove, a member movable circumferentially to the support, a plurality of levers pivotally connected to the member having their pivotal connections equally spaced from the axis of the support and their fulcrumed ends positioned for movement in the circumferential groove and linkage connecting the respective levers to the separable ends of the friction element of the brake.

8. A brake comprising a fixed support having a circumferential groove, a member adapted for circumferential movement relative thereto, levers pivotally connected to the member having their pivotal connections positioned in a plane extending diametrally through the fixed support, arcuate sections on the levers defining their fulcrums movably engaging the circumferential groove and links pivotally connecting the levers to the separable ends of the frictional member of the brake.

9. A brake comprising a backing plate, a drum associated therewith, an articulated friction member positioned for movement on the backing plate and adaptable for engagement with the drum, a support positioned on the backing plate intermediate the separable ends of the friction member, a member adapted for circumferential movement relative to the support, levers pivoted on the member having their fulcrum ends movably engaging the support and linkage connecting the levers to the respective separable ends of the friction member.

10. A brake comprising a backing plate, a drum associated therewith, an articulated friction member movably positioned on the backing plate for co-operation with the drum, a fixed support positioned on the backing plate intermediate the separable ends of the friction member having a circumferential groove, a member positioned for centrifugal movement relative to the fixed support, a plurality of levers pivoted to the member in equally spaced relation to the axis of the support and having their fulcrum ends movably positioned in the circumferential groove and links connecting the levers to the respective separable ends of the friction member.

11. A brake comprising a fixed support, a floating lever movable circumferentially thereto, spaced members pivotally connected to the floating lever having their free ends engaging the fixed support and adaptable for movement thereon and links connecting the spaced members to the separable ends of the friction elements of the brake.

12. A brake comprising a fixed support, lever fulcrumed on the support and adaptable for circumferential movement thereon, a member connecting the power applying ends of the levers adapted to equalize the applied force and links connecting the levers to the friction elements of the brake.

In testimony whereof, I have hereunto signed my name.

HUMPHREY F. PARKER.